United States Patent [19]
Kagaya
[11] 4,454,517
[45] Jun. 12, 1984

[54] PRINTING APPARATUS WITH COACTING PRINTER HEAD MOVEMENT AND PAPER ADVANCEMENT

[75] Inventor: Koji Kagaya, Kawasaki, Japan

[73] Assignee: Tokyo Shibaura Denki Kabushiki Kaisha, Kawasaki, Japan

[21] Appl. No.: 382,117

[22] Filed: May 26, 1982

[30] Foreign Application Priority Data

May 29, 1981 [JP] Japan .................................. 56-82019

[51] Int. Cl.$^3$ ...................... G01D 15/28; G01D 15/10
[52] U.S. Cl. ................................ 346/136; 346/76 PH
[58] Field of Search ........................... 346/76 PH, 136

[56] References Cited

U.S. PATENT DOCUMENTS

| | | | |
|---|---|---|---|
| 3,726,212 | 4/1973 | Combs | 346/76 PH |
| 3,787,886 | 1/1974 | McCrady | 346/136 X |
| 4,378,566 | 3/1983 | Tsukamura | 346/76 PH |

*Primary Examiner*—George H. Miller, Jr.

*Attorney, Agent, or Firm*—Cushman, Darby & Cushman

[57] ABSTRACT

A printing apparatus wherein a transfer printing medium brought from the feed reel by the pinched transfer printing medium-forwarding mechanism is superposed on one unimpressed sheet after another supplied from a sheet-feeding means; data is impressed on the printing plane of the sheet; the pinching of the transfer printing medium by said transfer printing medium-forwarding mechanism is effected by means of a link mechanism interlockingly with the superposition of the printing head block on the transfer printing medium, and the disengagement of the transfer printing medium from said transfer printing medium-forwarding mechanism is effected also by means of said link mechanism interlockingly with the release of the printing head block from the transfer printing medium; and the above-mentioned pinching and disengagement of the transfer printing medium are respectively carried out by a single operation, thereby simplifying the loading of said transfer printing medium on the subject printing apparatus.

8 Claims, 16 Drawing Figures

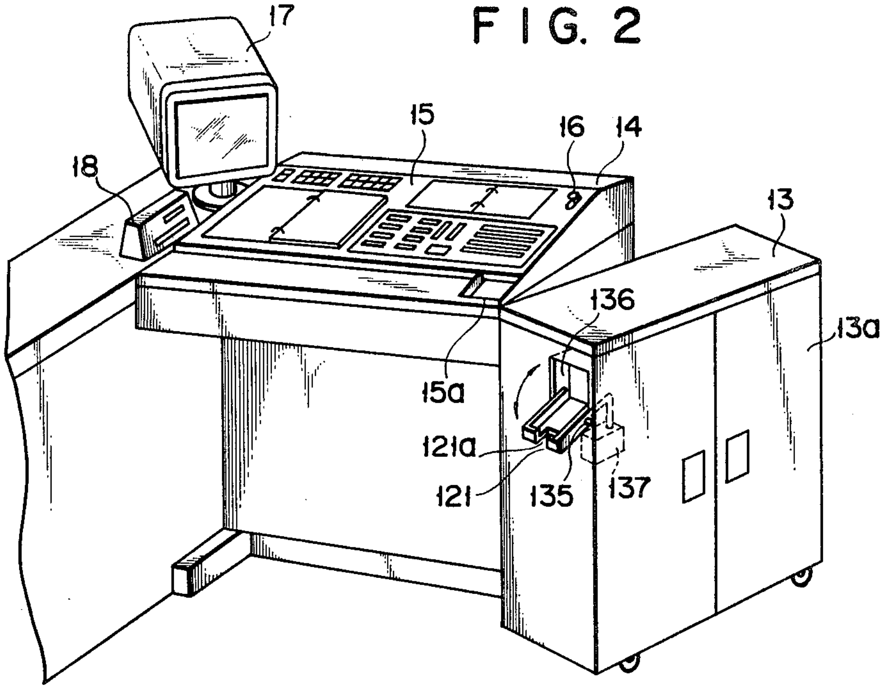
F I G. 2
F I G. 4A
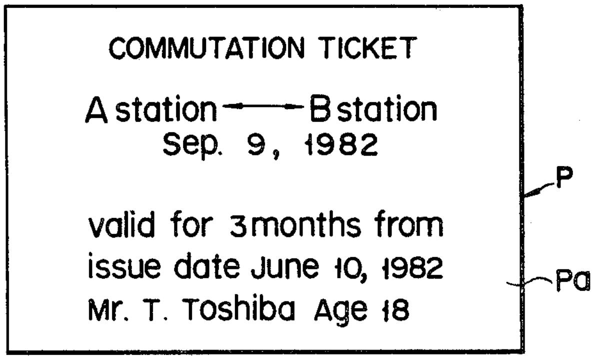
F I G. 4B
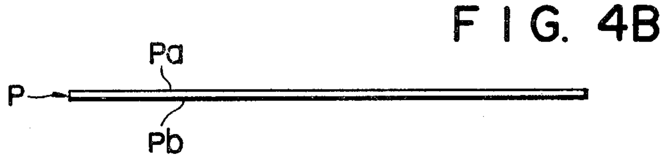

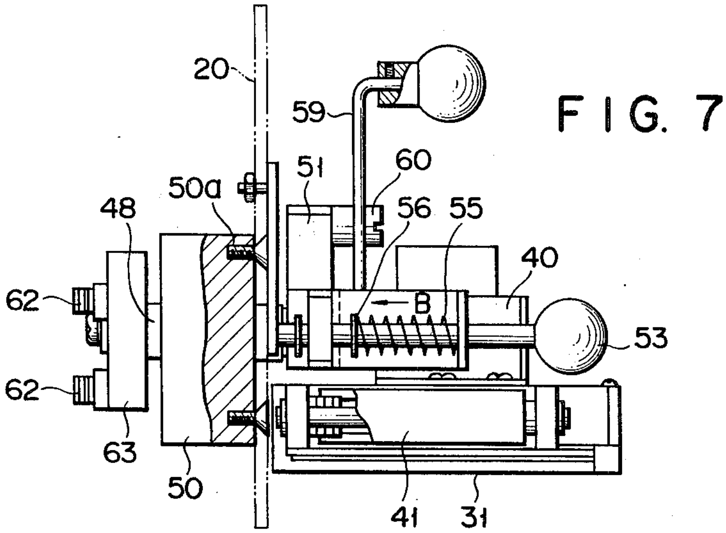
FIG. 7
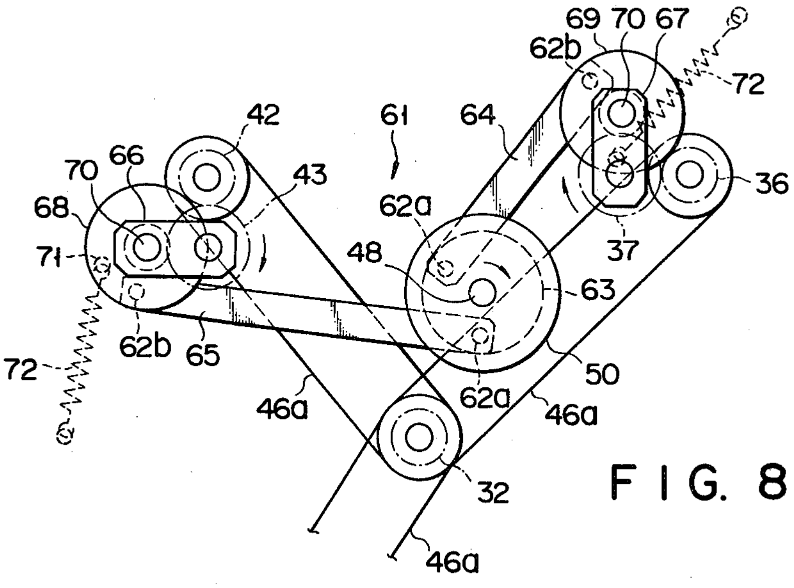
FIG. 8
FIG. 9
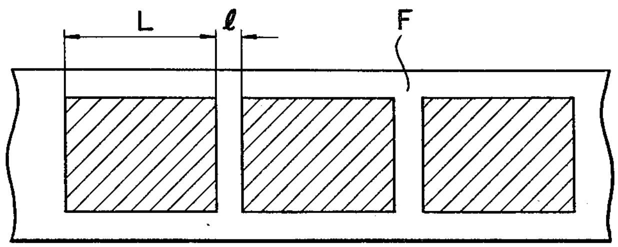

FIG. 13
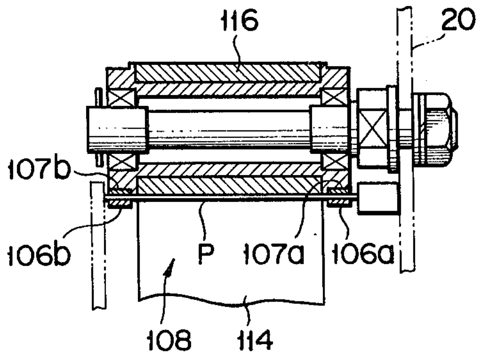
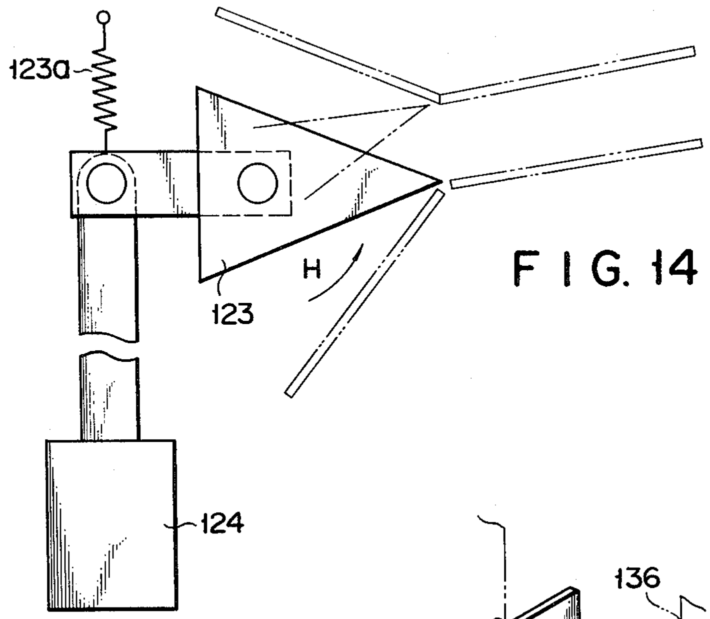
FIG. 14
FIG. 15
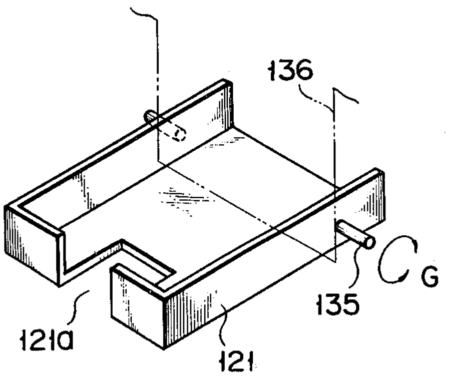

PRINTING APPARATUS WITH COACTING PRINTER HEAD MOVEMENT AND PAPER ADVANCEMENT

BACKGROUND OF THE INVENTION

This invention relates to a transfer printing apparatus useful for a printing machine designed to issue, for example, a commutation ticket or passenger ticket by applying a transfer printing medium such as thermal transfer film.

With a conventional printing machine designed to print and issue a ticket by means of a band-shaped transfer printing medium such as a thermal transfer film coated with or containing a transfer dyestuff, the transfer medium has been drawn out or taken up in the manner as shown in FIG. 1. The transfer medium F is taken up on a feed reel 1 with a transfer agent-coated surface exposed to the outside. The leading end portion of the transfer medium F is stretched over a tension arm 2, passes between a feed roller 3 and pinch roller 4, and over a guide roller 5. Then said leading end portion is clamped between a thermal printing head 6 and head-pressing roller 7, passes over a releasing roller 8, is guided between a feed roller 9 and pinch roller 10, is stretched over a tension arm 11, and finally is wound about a takeup reel 12. The pinch rollers 4, 10 which are urged by a spring (not shown) always press the feed rollers 3, 9. The thermal printing head 6 is set in a state rotatable in the direction of an arrow indicated in FIG. 1, and is urged by a spring (not shown) to press the head-pressing roller 7.

However, the conventional printing machine has the drawbacks that when the transfer medium F is used up, or cut off in an intermediate part, the pinch rollers 4, 10 and printing head 6 have to be lifted respectively in the direction of an indicated arrow; and a fresh transfer printing medium has to be loaded, with great difficulties and consumption of much time.

SUMMARY OF THE INVENTION

This invention has been accomplished in view of the above-mentioned circumstances and is intended to provide a printing apparatus of simple arrangement which facilitates the loading of a transfer printing medium and produces, for example, a highly reliable sheet at extremely low cost.

To attain the above-mentioned object, this invention provides a printing apparatus which comprises:

means for feeding a sheet;

transfer printing means for transferring data to the surface of a sheet on which a transfer printing medium coated with or containing a transfer dyestuff is superposed;

means consisting of an assembly of a feed reel and takeup reel to forward the transfer printing medium to the transfer printing means;

means provided on the feed side and takeup side of the transfer printing medium-feeding means to guide said transfer printing medium in a pinched state; and a link mechanism for enabling the transfer printing medium to be pinched by the transfer printing medium-forwarding means interlockingly with the superposition of the printing head on the transfer printing medium and for releasing said transfer printing medium from a pinched state interlookingly with the removal of the printing head from the transfer printing medium.

BRIEF DESCRIPTION OF THE DRAWINGS

FIG. 2 is an oblique view of a printing system using a printing machine provided with a printing apparatus embodying this invention;

FIG. 4A is a plan view of the impressed surface of a sheet;

FIG. 4B is a side view of the sheet;

FIG. 7 is an enlarged side view, partly in section, of said printing head block;

FIG. 8 is a sectional view on line VIII—VIII of FIG. 5 taken in the direction of the indicated arrow;

FIG. 9 illustrates the manner in which the transfer printing medium is effectively utilized;

FIG. 13 is a cross sectional view of a sheet-guiding passage formed in a magnetic writing section;

FIG. 14 is a front view of an impressed sheet-sorting gate; and

FIG. 15 is an oblique view of a sheet-storing box.

DETAILED DESCRIPTION OF THE PREFERRED EMBODIMENT

Figure 1:
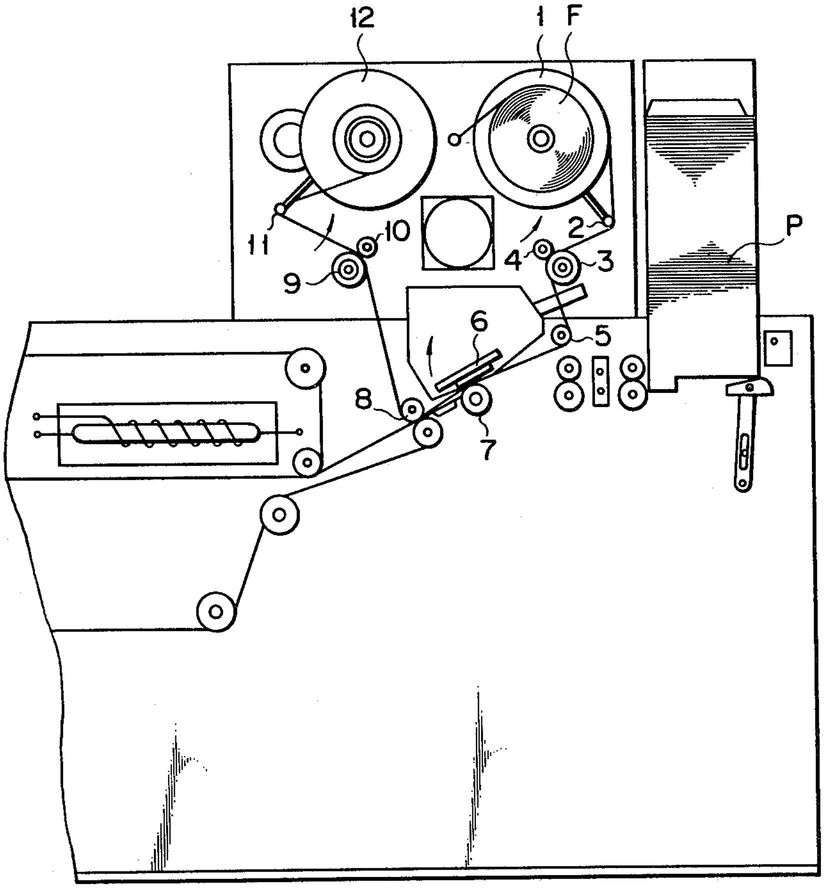
FIG. 1 schematically shows the arrangement of the conventional transfer printing apparatus.

Description is now given of a printing system for issuing a commutation sheet or passenger sheet which is provided with a printing apparatus embodying this invention.

As shown in FIG. 2, a printing system comprises a printing machine 13 holding a printing apparatus embodying this invention and an operation device 14 containing a control circuit. In the case of a commutation sheet, data, for example, on the railroad section and effective period are preset in a control panel unit 15, and an application form denoting a user's name and other data is set on a reading window 15*a*. When, under this condition, the printing system is operated, a railroad fare is computed in the control circuit. Items of preset data are shown in a cathode ray tube (CRT) display device 17 for confirmation. The railroad fare is indicated on a fare display device 18. On the other hand, the printing machine 13 impresses data on all the required items including data concerning the user which are preset in the control panel unit 15 on to a printing sheet supplied, thereby causing a finished commutation sheet to be delivered to a sheet-storing box 121.

Figure 3:
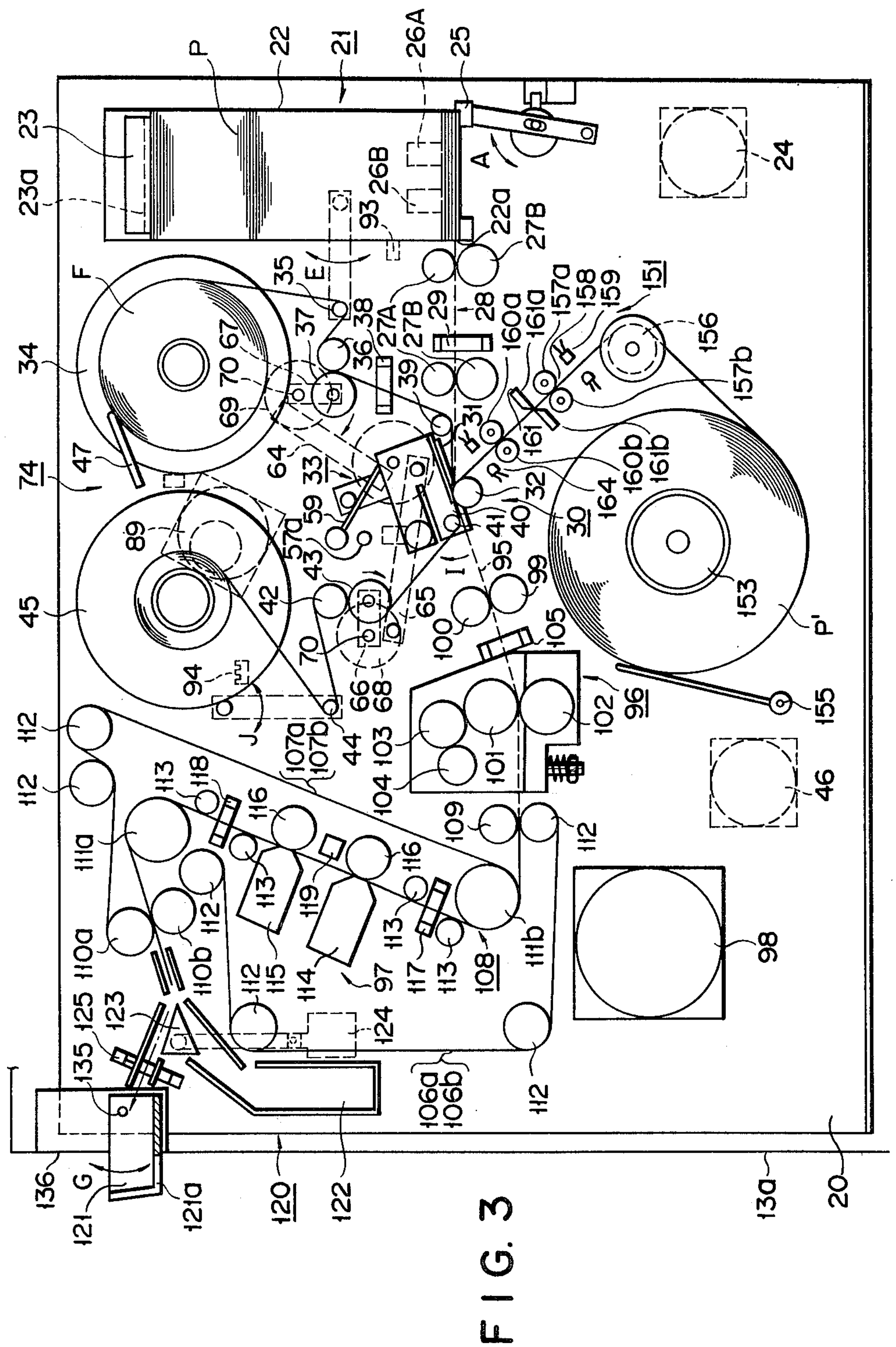
FIG. 3 schematically indicates the arrangement of the printing apparatus of the invention.

The printing machine 13 comprises, as shown in FIG. 3, a first sheet-feeding mechanism 21, transfer printing mechanism 30, a transfer medium pinching and guiding mechanism 33, transfer medium feeding mechanism 74, pressure-fixing mechanism 96, ticket storage mechanism 120 and second sheet-feeding mechanism 151.

The sheet-feeding mechanism 21 is shown at the upper part of the indicated right side of a printing apparatus-fitting substrate 20. This sheet-feeding mechanism 21 is designed to feed card-shaped sheets P one after another to the transfer printing mechanism 30. As shown in FIGS. 4A and 4B, one plane of the sheet P is used as a printing plane Pa and the opposite plane is used as a magnetic recording plane Pb, where required. Reference numeral 22 given in FIG. 3 denotes a hopper for holding a plurality of sheets P with the printing surface Pa thereof turned upward. A weight 23 is mounted on the uppermost one of superposed sheets P held in the hopper 22. Mounted on the wall of the lower part of the hopper 22 are a detector 26A for indicating that the sheets P held in the hopper 22 have been used up to a certain extent and another detector 26B for indicating that the sheets P have been used up. Fitted to the bottom of the hopper 22 is a sheet-forwarding picker 25 swung by a sheet-forwarding motor 24 through a drive-transmitting device (not shown).

The sheets P are taken out one after another through an outlet slit 22*a* formed at the bottom of the hopper 22. Formed in the bottom of the weight 23 is a depression 23*a* through which the picker 25 is guided when swung. The above-mentioned arrangement enables all the superposed sheets held in the hopper 22 to be forwarded to the transfer printing mechanism 30. One side of the weight 23 is provided with two slits allowing for the escapement of the operating arms of the previously described detectors 26A, 26B.

When the control panel unit 15 sends forth a sheet-issuing instruction, the sheet-forwarding motor is first driven to let the picker 25 swing in the mutually opposite directions of the indicated arrows, thereby causing the sheets P to be forwarded to the transfer printing mechanism 30 one after another through the slit 22*a* of the hopper 22. The sheet P thus taken out is supplied to a sheet-forwarding passage 28 consisting of a plurality of groups of feed rollers 27A, 27B. A sheet detector 29 is mounted on said sheet-forwarding passage 28. When detecting the arrival of a sheet, said detector 29 stops the sheet-forwarding motor 24. At this time the sheet P is brought to rest at the terminal end of the sheet-forwarding passage 28.

Figure 6:
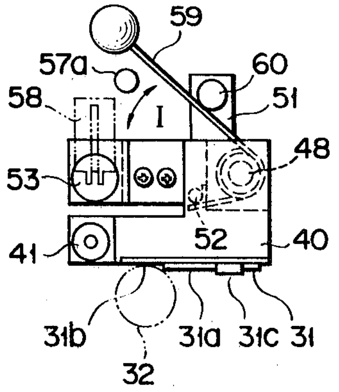
FIG. 6 is a front view of a printing head block.

Provided adjacent to the terminal end of the sheet-forwarding passage 28 is a transfer printing mechanism 30 which causes a visible impression written by a ticket user on an application form to be transferred on the printing plane of the sheet P. This transfer printing mechanism 30 comprises, as shown in FIG. 6, a thermal recording plane 31*a*, heat generator 31*b*, heat-sensitive printing head 31 fitted to a head block 40 by a holder 31C and head-pressing roller 32 facing said printing head 31. The heat generator 31*b* is constructed by parallel arranging of, for example, six heating wires at every interval of 1 mm along a line intersecting at right angles the direction in which the sheet is forwarded to the transfer printing mechanism 30. An assembly of a heat-sensitive transfer medium F (for example, a film) superposed on a sheet is forwarded by a drive roller 32 in a state pinched between the transfer printing head 31 and pressing roller 32. When the wires of the heat generator 31*b* are selectively heated in accordance with an instruction sent forth from the control panel unit 15 as the sheet P is forwarded, then the transfer dyestuff coated on the transfer medium F is transferred onto the sheet P, thereby impressing thereon the original impression written by a ticket user on an application form.

Reference numeral 74 given in FIG. 3 denotes a mechanism for forwarding a transfer printing medium F to the transfer printing mechanism 30. This mechanism 74 comprises the later described feed reel 34 and takeup reel 45. A transfer printing medium F is wound about the feed reel 34 with the transfer printing agent-coated plane exposed to the outside. The leading end portion of said transfer printing medium F is stretched over a tension arm 35, one end of which is rotatably supported on the substrate 20. The transfer printing medium F is pinched between a pinch roller 37 and a return roller 36 provided with a one-way clutch sliding counterclockwise. Later, the transfer printing medium F passes through a detector 38 for detecting the arrival of said transfer printing medium F, runs over a guide roller 39, is pinched between the transfer printing head 31 and head-pressing roller 32, and is stretched over a releasing roller 41 which is rotatably mounted on a head block 40 holding the transfer printing head 31. Later, the transfer printing medium F is further forwarded in a state clamped between a pinch roller 43 and feed roller 42 provided with a clockwise sliding one-way clutch. The transfer printing medium F passes over a tension arm 44, one end of which is rotatably supported on the substrate 20, and finally is wound about a takeup reel 45.

Figure 5:
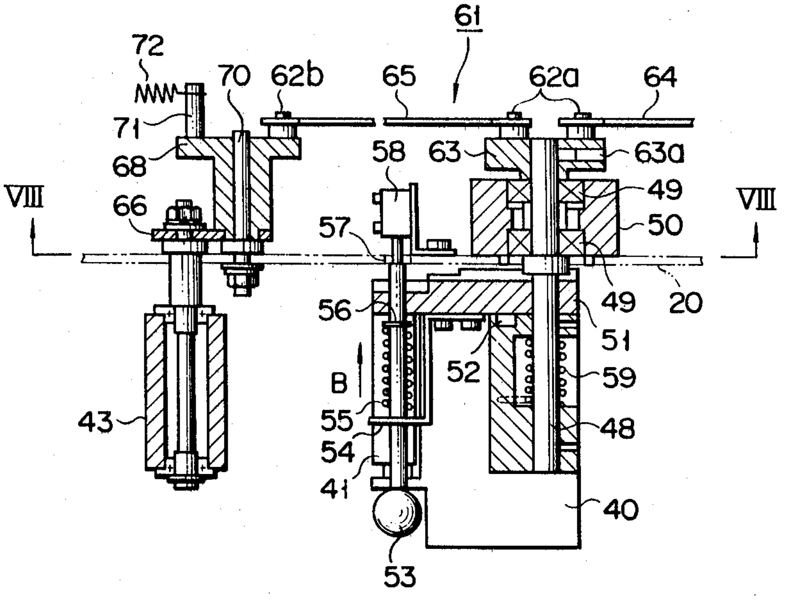
FIG. 5 is a cross sectional view of a transfer printing mechanism.

As seen from FIGS. 5, 6 and 7, the head block 40 holding the transfer printing head 31 is fixed to one end of a pivotal shaft 48, the other end of which is rotatably supported by a pair of bearings 49, 49 of a housing 50 fitted to the backside of the substrate 20 by a screw 50*a* (FIG. 7). The head block 40 is made to swing around the pivotal shaft 48 in the mutually opposite directions of two indicated arrows I. Rotatably fitted to the intermediate part of the pivotal shaft 48 is a lift board 51 at one end, which is provided with a projecting pin 52 loosely fitted into the head block 40. The other end portion of said lift board 51 is penetrated by a set shaft 53. A spring 55 is provided in a holder 54 fitted to the lift board 51. This spring 55 urges a stop ring 56 engaged with the set shaft 53, thereby causing said set shaft 53 to project in the direction of an indicated arrow B. The projecting end portion of said set shaft 53 is inserted into a set hole 57 formed in the substrate 20. Provided on the backside of the set hole 57 is a detector, for example, a microswitch 58 (FIG. 5), which judges whether the set shaft 53 is properly set in said set hole 57. Reference numeral 59 denotes a head-pressing spring, one end of which is engaged with a spring rest 60 projectively mounted on the lift board 51, and the other end of which is pressed against the head block 40, thereby urging the printing head 31 mounted on the head block 40 so as to be pressed against the head-pressing roller 32. When the transfer printing medium F is released from a state pinched between the printing head 31 and pressing roller 32 as shown in FIG. 6, the following steps are taken. Namely, the set shaft 53 is first drawn out of the set hole 57. The lift board 51 is made to swing in the directions of the two indicated arrows I. As a result, the head block 40 and pivotal shaft 48 are jointly rotated by means of a pin 52 loosely fitted into the head block 40, thereby disengaging the printing head 31 from the pressing roller 32. When, under this condition, the projecting end of the set shaft 53 is inserted into the holding hole 57*a* formed in the substrate 20, then the printing head 31 is kept disengaged from the pressing roller 32. At the time of said disengagement, an interlocking circuit is produced upon receipt of a signal from the detector 58 in order to prevent the subject printing apparatus from being operated.

Description is now given of a transfer printing medium F-releasing mechanism 61 included in the mechanism 33 for guiding said transfer printing medium F in a pinched state. A link holder 63 provided with a pair of link pins 62a is fitted by means of the pressing screw 63a to the opposite end of the pivotal shaft 48 to that thereof which is fitted to the head block 40. A pair of links 64, 65 are rotatably fitted at one end to said paired link pins 62a. Said paired links 64, 65 are rotatably supported by a pair of link pins 62b of bosses 68, 69 rotatably fitted around lever shafts 70, 70 fixed to the substrate 20. A lever 66 is fixed to the other end of the boss 68, and a lever 67 is fixed to the other end of the boss 69. A pivotal shaft of the pinch roller 43 is fixed to the lever 66. A pivotal shaft of the pinch roller 37 is fixed to the lever 67. A spring hanger 71 is fitted to the bosses 68, 69 respectively. Springs 72, 72 fitted at one end to the substrate 20 are fixed at the other end to said spring hangers 71. Referring to FIG. 3, the pinch roller 37 is pressed against the return roller 36, and the pinch roller 43 is pressed against the feed roller 42, thereby causing the transfer printing medium F to be forwarded and returned in a pinched state. The transfer printing medium F is released from a state pinched by the pinch rollers 37, 43 by the same process as that which is used to disengage the printing head 31 from the pressing roller 32. Namely, the head block 40 and pivotal shaft 48 are rotated, and the rink holder 63 is also rotated in the direction of an arrow shown in FIG. 8. As a result, the levers 66, 67 are rotated by means of the corresponding links 65, 64, thereby disengaging the pinch rollers 37, 43 from the return roller 36 and feed roller 42 respectively.

The pressing roller 32, return roller 36 and feed roller 42 included in the mechanism 33 for forwarding the transfer printing medium F are simultaneously rotated by a reversible motor 46 mounted on the backside of the substrate 20 with the aid of a drive-transmission member 46a, for example, a timing belt shown in FIG. 8. The return roller 36 only returns the transfer medium F by means of a counterclockwise sliding one-way clutch. The feed roller 42 only forwards the transfer printing medium F by means of a clockwise sliding one-way clutch. The transfer printing medium F is returned to minimize its wasteful application. As illustrated in FIG. 9, the transfer printing medium F generally requires a printing region having a measurement L per sheet. Further, said transfer printing medium F requires an area corresponding to a transfer printing medium-forwarding distance l between the heat generator 31b of the printing head 31 and the releasing roller 41 used to change the direction in which the transfer printing medium F is to be forwarded. In other words, the transfer printing medium F is wasted to an extent corresponding to said distance l. Therefore, immediately after the sheet is removed from the transfer printing medium F, the drive of the motor 46 is reversed to return the transfer printing medium F to a prescribed extent by the return roller 36.

Figure 10:
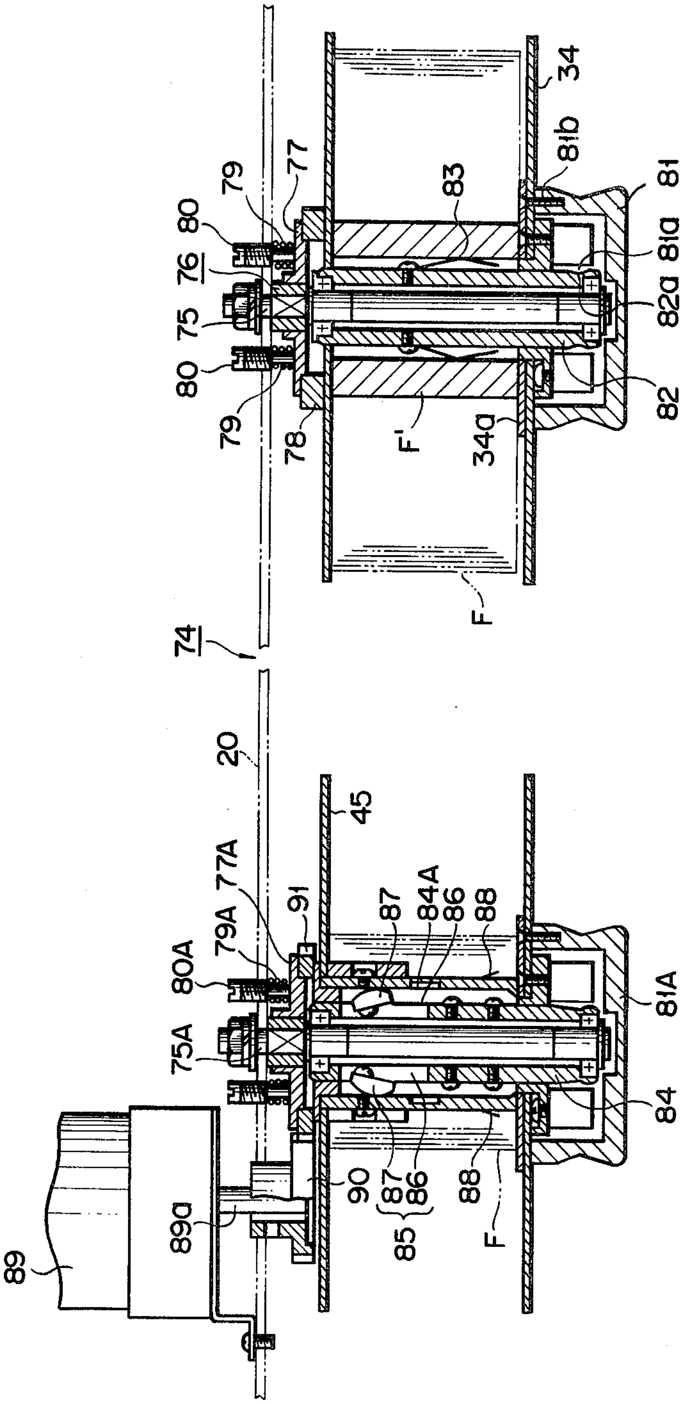
FIG. 10 is a cross sectional view of a mechanism for feeding a transfer printing medium.

Description is now given with reference to FIG. 10 of the operation of the feed reel 34 and takeup reel 45 included in the transfer printing medium F-forwarding mechanism 74. The feed reel 34 is rotatably mounted on a reel shaft 75 fixed to the substrate 20. A brake mechanism 76 is provided between the feed reel 34 and substrate 20 in order to prevent the idle rotation of the feed reel 34. Said brake mechanism 76 comprises a brake board 78 sliding along the rear face of the feed reel 34; a pressing board 77 which is slidably pressed against the brake board 78, and into the square hole of which there is fitted a reel shaft 75 having a square cross section, thereby enabling said pressing board 77 to be rotated with said reel shaft 75; a spring 79 for urging said pressing board 77; and an adjust bolt 80 for controlling the urging force of said spring 79. The reference numeral 81 is a cap for pressing the transfer printing medium F to prevent its displacement. One (34a) of the frames of the feed reel 34 is fitted to the outer edge of said cap 81 by means of a screw 81b. An engagement projection 81a is detachably provided in the recess 82a formed at the lower end of the shaft 82 of the feed reel 34, thereby enabling said cap 81 to be easily fitted or removed. A plate spring 83 is fitted to the shaft 82, thereby preventing a hub F' wound with the transfer printing medium F from being rotated in the feed reel 34.

The takeup reel 45 is provided with a lock mechanism consisting of a plate spring 86 for holding the takeup reel 45 and metal stopper 87. A stop hole engageable with said metal stopper 87 is formed in that part of the hollow shaft 84A of the takeup reel 45 which faces said metal stopper 87, thereby enabling the takeup reel 45 to be easily engaged with said hollow shaft 84A and disengaged therefrom. A pair of plate springs 88 are fitted to the outer peripheral wall of the hollow shaft 84A of the takeup reel 45 to insert the leading end portion of the transfer printing medium F into a space defined between said plate springs 88 and the outer peripheral wall of said hollow shaft 84A. The cap 81A of FIG. 10 has the same construction as the cap 81 of the feed reel 34. A motor 89 for driving said takeup reel 45 is mounted on the backside of said takeup reel 45. A brake gear 91 is rotated by means of a gear 90 fitted to the motor shaft 89a. A friction between said brake gear 91 and the outer peripheral wall of the shaft 84 transmits the drive force of the motor 89 to said shaft 84. A pressing board 77A having a square cross section and unrotatably fitted into the square hole of the hollow reel shaft 75A is mounted on the brake gear 91. A spring 79A whose urging force is controlled by an adjust bolt 80A urges said pressing board 77A, thereby producing a frictional force between the brake gear 91 and hollow shaft 84. The drive motor 89 is started or stopped, depending on the position of the later described tension arm 44 (FIG. 3).

A tension arm 35 (FIG. 3) is made swingable in the opposite directions indicated by two arrows E, thereby imparting a suitable tension to the transfer printing medium F when returned from the feed reel 34. Provided below said tension arm 35 is a detector 93 for detecting the position of the tension arm 35. When the transfer printing medium F is broken or exceedingly sagged while being conducted between the feed reel 34 and return roller 36, the tension arm 35 is rotated downward by its own weight. The rotated position of said tension arm 35 is detected by the detector 93. A tension arm 44 is made to swing in the opposite directions indicated by two arrows J. A spring (not shown) always urges the tension arm 44 to the left side of FIG. 3. Provided on the right side of said tension arm 44 is a detector 94 for indicating the position of said tension arm 44. When the transfer printing medium F is forwarded to the printing mechanism by one feed roller 42, and the tension arm 44 is swung to the left by the urging force of the spring (not shown) and ceases to be detected by said detector 94, the motor 89 is driven to rotate the takeup reel 45, thereby causing the transfer printing medium F to be wound around said takeup reel 45. Even if the transfer printing medium F happens to run backward during the takeup operation, the takeup reel 45 which is driven by the aforementioned frictional force prevents the transfer printing medium F from being broken by excess tension. A reference numeral 38 (FIG. 3) denotes a detector which indicates the breakage of the transfer printing medium F which happens while said transfer printing medium F is transported between the return roller 36 and guide roller 39. A reference numeral 47 is a detector which indicates that the transfer printing medium F wound about the feed reel 34 has been consumed to some extent.

Figure 11:
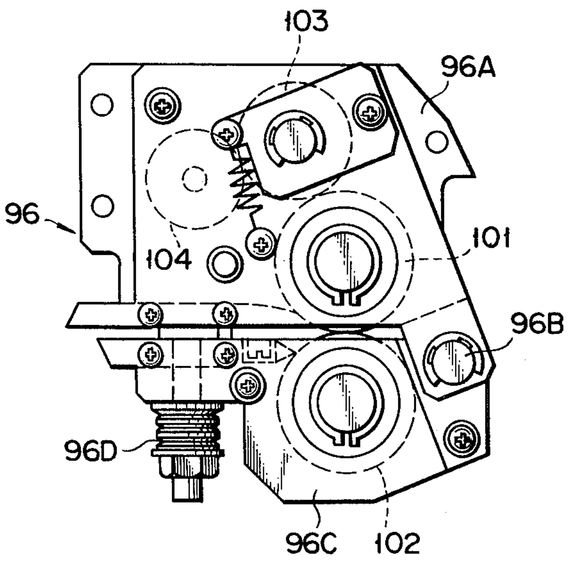
FIG. 11 is a front view of a pressure fixing mechanism.
Figure 12:
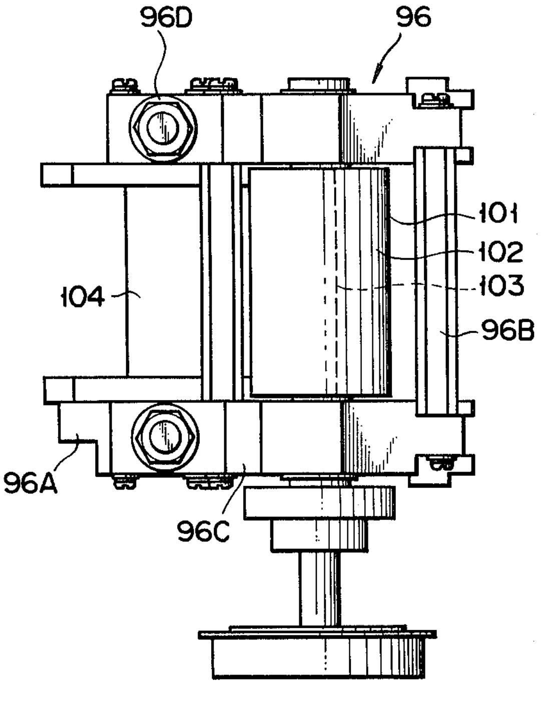
FIG. 12 is a bottom view of said pressure fixing mechanism.

Continuously arranged in the passage through which a sheet P is forwarded by the transfer printing mechanism 30 are a passage 95 through which a printed sheet P separated from the transfer printing medium F is carried, pressure fixing mechanism 96, sheet-forwarding passage and printed sheet storage mechanism 120. Speed acceleration feed rollers 100, 109, fixing feed roller 101 and rollers 110*a*, 110*b* for driving a transfer printing medium-forwarding belt are simultaneously rotated by the motor 98 with the aid of a drive-transmission member, for example, a belt. The sheet P is forwarded from the hopper 22 and through the transfer printing mechanism 30 at a speed of 50 mm/sec, through the printed sheet passage 95 at an increased speed of 500 mm/sec, and through the impression-fixed sheet passage 108 at a speed of 1600 mm/sec, thereby reducing a length of time required to issue a finished sheet. The printed sheet passage 95 is constituted by a forwarding roller 99 and speed acceleration roller 100, and is designed to forward a transfer printed sheet to the pressure fixing mechanism 96 at an intermediate speed. As shown in FIGS. 11 and 12, the pressure-fixing mechanism 96 comprises a fixing feed roller 101 mounted on a frame 96A fixed to the substrate 20; pressing roller 102 mounted on a frame 96C swingably fitted to the frame 96A by means of a pin 96B; an intermediate roller 103 pressed against the fixing feed roller 101; and a silicone-impregnated roller 104 pressed against said intermediate roller 103. The pivotal portions of the frames 96A, 96C and the opposite sides thereof are urged by a large number of urging means, for example, dish springs 96D to be pressed against both fixing feed roller 101 and pressing roller 102. A sheet P printed by the transfer printing mechanism 30 and brought through the printed sheet passage 95 is guided by the pressure fixing mechanism 96 between the fixing feed roller 101 and pressing roller 102. At this time, data impressed on the printing plane of the sheet P is mechanically tightly set by the pressure of the pressing roller 102 and further chemically fixed by applying the silicone impregnated into the roller 104 on the printing plane of the sheet P. The impression-fixed sheet P is sent forth to the passage 108. A reference numeral 105 shown in FIG. 3 denotes a detector for indicating the arrival of the printed sheet P at the pressure fixing mechanism 96.

As seen from FIGS. 3 and 13, the sheet passage 108 is constituted by a space defined between the mutual facing portions of an upper belt 107*a* and a lower belt 106*a* and the mutual facing portions of an upper belt 107*b* and a lower belt 106*b*, and also by a space defined between the extensions of the lower belts 106*a*, 106*b* and the speed acceleration feed roller 109 (FIG. 3). The impression-fixed sheet P is quickly forwarded through said passage 108 to a finished sheet-storing box 121. Reference numeral 110*a* denotes a roller for driving the upper group of belts 107*a*, 107*b*, and reference numeral 110*b* shows a roller for driving the lower group of belts 106*a*, 106*b*. Reference numerals 111*a*, 111*b*, 112, 113 represent a plurality of belt-guiding rollers. Provided in the intermediate part of the above-mentioned sheet passage 108 is a magnetic recording device 97 which, in case of need, magnetically records on the magnetic recording plane Pb of the sheet P the data which is read on, for example, an automatic sheet-examining device. The magnetic recording device 97 comprises a write magnetic head 114 actuated by an instruction issued from the control panel unit 15 and the succeeding read magnetic head 115 for checking the magnetically recorded data. Reference numeral 116 denotes head-pressing rollers respectively facing the magnetic heads 114, 115. Provided in the sheet passage 108 is a detector 117 for indicating a timing in which magnetic writing is to be made and a detector 118 for indicating the completion of magnetic reading. Further, a reflector type printing detector 119 is provided to distinguish whether a prescribed data has been impressed on the printing plane of the sheet P. The terminal portion of the sheet passage 108 is provided with the sheet storage mechanism 120 comprising a sheet-storing box 121 and sheet-sorting gate 123. As indicated in FIG. 14, the sorting gate 123 is rotated by a solenoid 124. Ordinarily, the sorting gate 123 is held in a horizontal position by the urging force of a spring 123*a* to guide a sheet carried through the sheet passage 108 to the sheet-storing box 121. When the absence of any impression on the printing plane of the sheet P is detected by the checking read magnetic head 115 and printing detector 119, then the solenoid 124 is actuated, thereby causing the sorting gate 123 to be rotated in the direction of an arrow H shown in FIG. 14 against the urging force of the spring 123*a*. As a result, an abnormal sheet is guided to a second sheet-storing box 122. On the other hand, an ordinary printed sheet is taken into the sheet-storing box 121 through a sheet withdrawal detector 125. As shown in FIGS. 2, 3 and 15, the sheet-storing box 121 is provided with a sheet outlet notch 121*a* and rotatably mounted by means of a pin 135 on a sheet outlet 136 formed in the box 13*a* of the printing machine 13. The sheet-storing box 121 is fitted with a solenoid 137 and a spring (not shown). When said solenoid 137 is energized by a power supply switch 16 set in the control panel unit 15 of the operation device 14, the sheet-storing box 121 is made to swing out of the box 13*a* of the printing machine 13 in case of need as shown in FIG. 2. When the solenoid 137 is deenergized, the sheet-storing box 121 is retracted into the printing machine 13 by the urging force of a spring (not shown) to close a ticket outlet 136. Where necessary, the subject printing apparatus is provided, as shown in FIG. 3, with a second sheet-forwarding mechanism 151 for conducting a roll of a band-shaped sheet P' to the printing machine 13. A reel 153 is fitted to the right low part of the substrate 20. This reel 153 is wound with the band-shaped sheet P'. Set adjacent to said reel 153 is a detector 155 for indicating the remaining amount of said band-shaped sheet P' wound about the reel 153. Also provided near the reel 153 is a guide roller 156. A feed roller unit 158 consisting of a pressing roller 157*a* and fixed rate forwarding roller 157*b* is set at a prescribed distance from the guide roller 156. The fixed rate forwarding roller 157*b* is driven by a fixed rate driving motor (not shown) to guide the band shaped sheet P' between said fixed rate forwarding roller 157*b* and pressing roller 157*a*. Provided between the feed roller unit 158 and guide roller 156 is a detector 159 for indicating the presence or absence of the band shaped sheet P'. This detector is formed of, for example, a light-emitting element and light-receiving element.

Provided behind the feed roller unit 158 (namely, on the opposite side of said feed roller unit 158 to said guide roller 156) are a pair of feed rollers 160a, 160b. A cutter 161 consisting of a pair of cutter blades 161a, 161b respectively set on and under a sheet passage is provided between the feed roller unit 158 and paired feed rollers 160a, 160b. A region behind the paired feed rollers 160a, 160b (that is, the region of said paired feed rollers 160a, 160b opposite to the cutter 161) is connected to the transfer printing machine 30 for thermally impressing a required data on the printing surface of the cut-up sheet P'. Provided between the paired feed rollers 160a, 160b and transfer printing head 31 is an optical detector 164 consisting of, for example, a light-emitting element and light-receiving element, thereby detecting the presence or absence of the cut-up sheet.

Description is now given with reference to FIG. 3 of the sheet-issuing operation of the subject printing apparatus. When the control panel unit 15 is arranged to feed an unimpressed sheet P to a transfer printing machine, then the unimpressed sheet P kept in a waiting position in the sheet-forwarding passage 28 is carried to the head-pressing roller 32 by the actuation of the picker 25. When the control panel unit 15 is arranged to feed an impressed band shaped sheet P' to the transfer printing machine, then the leading end portion of a roll of said sheet P' is cut up in a prescribed length. The cut-up piece is sent forth to the head-pressing roller 32. The succeeding operation is carried out in the same manner with respect to both unimpressed sheets P, P'. Therefore, description is only made of the transfer printing of an unimpressed sheet P. Immediately before the unimpressed sheet P is brought to the head-pressing roller 32, the transfer printing medium F forwarded by the feed roller 42 is made to run and the head-pressing roller 32 is rotated at the same speed as that at which said unimpressed sheet P travels. The transfer printing medium F is superposed on the unimpressed sheet P. The superposed mass is carried forward in a state pressed to the thermal printing head 30 by the head pressing roller 32. A prescribed data is printed on the unimpressed sheet P through the transfer printing medium F by the thermal printing head 30. Said thermal printing is carried out in such timing as is defined by actuating a timer when the rear end of the unimpressed sheet P brought immediately before the transfer printing machine is detected by the sheet detector 29. The printed sheet P is removed from the transfer printing medium F carried beyond the releasing roller 41, and then pinched between the forwarding roller 99 and speed acceleration roller 100. The printed sheet P is carried through the sheet passage 95 at a speed accelerated from 50 mm/sec to 500 mm/sec. The transfer printing medium F is carried from the feed reel 34 to the takeup reel 45 by means of the feed roller 42. When the tension arm 44 swings to the left, the motor 89 is driven upon receipt of a detection signal from the tension arm position detector 94, thereby causing the transfer printing medium F to be wound about one takeup reel 45. When the sheet P is carried through the sheet passage 95, the reversible motor 46 is driven backward to cause the transfer printing medium F to be retracted by the return roller 36 to a prescribed extent in order to minimize the waste of the transfer printing medium F.

The sheet P carried from the transfer printing medium F into the sheet passage 95 is forwarded by the speed acceleration feed roller 100 at an intermediate speed with both unimpressed edges of said printed sheet P pinched between said speed acceleration feed roller 100 and forwarding roller 99 to the pressure fixing mechanism 96. At this time, a prescribed data impressed on the printing plane of the sheet P is fixed. Silicone impregnated into the roller 104 is applied all over the impressed surface of the sheet P, thereby rendering said impressed surface sufficiently durable to be used with an automatic sheet-examining machine designed to read impressed data.

An impression-fixed sheet P carried through the pressure fixing mechanism 96 is pinched between the lower belt 106a and speed acceleration roller 109 as well as between the lower belt 106b and said speed acceleration roller 109, and carried through the sheet passage 108 at a speed accelerated from 500 mm/sec to 1600 mm/sec with both edges of said sheet P respectively pinched between the upper belt 107a and lower belt 106a as well as between the upper belt 107b and lower belt 106b. Later, the sheet P is forwarded with its magnetic recording plane made to face the magnetic recording device 97. Data mechanically read from the sheet P is magnetically recorded by the write magnetic head 114. The magnetically recorded data is read by the read magnetic head 115 for checking. At this time, the intensity of light beams reflected from the printing plane of the sheet P is determined by the printing detector 119, thereby judging whether an impression is made or not on the printing plane of the sheet P. When data magnetically recorded on the sheet P is checked by the read magnetic head 115, and errors are found in said magnetically recorded data, or when the absence of any impression is confirmed as the result of checking the intensity of light reflections by the printing detector 119, then the solenoid 124 is energized. At this time, the sorting gate 123 is rotated in the direction of an arrow H indicated in FIG. 14, thereby causing an abnormal sheet carried through the passage 108 to be received in the second sheet-storing box 122. When the solenoid 124 is deenergized by a timer, then a normal sheet P carried through the passage 108 is brought into the first sheet-storing box 121 through one sorting gate 123. An abnormal sheet automatically taken into the second sheet-storing box 122 can be distinguished instantly. When, therefore, a large number of printed sheets are continuously issued, the provision of the above-mentioned sorting gate 123 makes it possible to save the trouble of picking up an abnormal sheet from among a large number of printed sheets which might otherwise be indiscrimately collected in a sheet-storing box.

When the film absence detector 38 indicates that no transfer printing medium F is wound about the feed reel 34, the subject printing apparatus is provided with the means which issues a particular signal to the control panel unit 15, thereby informing the operator of the absence of said transfer medium F. As a result, a fresh transfer medium is loaded on said transfer printing apparatus.

Description is now given of the process of loading a transfer printing medium F. First, the set shaft 53 fitted to the lift board 51 rotatably supported by the pivotal shaft 48 is pulled from the set hole 57, and is rotated in the direction of one of two arrows I indicated in FIG. 6. As a result, the pin 52 loosely fitted into the head block 40 is rotated therewith, causing the pivotal shaft 48 to be also rotated. At this time the link holder 63 fitted to the outer end of said pivotal shaft 48 is rotated, thereby causing the pinch roller 37 pressed against the return roller 36 to be rotated apart therefrom in the direction of an arrow shown in FIG. 3 by means of the link 64 and also causing the pinch roller 43 pressed against the feed roller 42 to be rotated apart therefrom in the direction of an arrow given in FIG. 3 by means of the link 65. When the set shaft 53 is inserted into the holding hole 57*a*, the pinch rollers 37, 43 are separated from the corresponding return roller 36 and feed roller 42, and the thermal printing head 30 fitted to the head block 40 is separated from the head pressing roller 32. After a fresh transfer printing medium F is loaded through the aforesaid loading passage, the set shaft 53 inserted into the holding hole 57*a* is pulled out, and then taken into the set hole 57. As a result, the pinch rollers 37, 43 and thermal printing head 30 regain the original position. The fresh transfer printing medium is stretched in position, ready for the issue of the succeeding printed sheet.

As previously described, the link mechanism 61 for releasing the mechanism 33 which forwards the transfer printing medium F in a pinched state is operated interlockingly with the rotating of the head block 40 of the transfer printing mechanism 30. This arrangement enables a passage for loading the transfer printing medium F to be formed by a single operation, thereby greatly facilitating the loading of the transfer printing medium F on the subject printing apparatus.

The foregoing embodiment refers to the thermal transfer printing process. However, this invention need not be exclusively used for this printing process, but is applicable to the wire dot process in which the transfer printing medium F is formed of an ink ribbon, or the process in which printing types are applied. The fixing mechanism need not be limited to the pressure fixing mechanism. But it is possible to apply a flash fixing mechanism for fixing a prescribed impression on a sheet by means of the energy of light beams flashed from a Xenon flash tube.

The printing apparatus of this invention arranged as described above enables the transfer printing medium F pinching mechanism to be released by rotating the printing head when a fresh medium is loaded.

Therefore, a fresh transfer printing medium F can be loaded more easily than in the past. In other words, this invention offers the great advantage of manufacturing a printing apparatus of extremely simple arrangement with high reliability and at low cost.

What is claimed is:

1. A printing apparatus which comprises:

sheet-supply means for supplying a sheet;

transfer printing means including a printing head moveable between superposed and nonsuperposed positions with respect to a tranfer printing medium provided with a dyestuff on the surface of a sheet delivered by said sheet-supply means and for transferring a dyestuff corresponding to a pattern of data from the transfer printing medium to the surface of the sheet;

transfer printing medium supply means having a feed side including a feed reel and a takeup side including a takeup reel to forward the tranfer printing medium to the transfer printing means;

clamping and forwarding means for clamping and forwarding the transfer medium, said clamping and forwarding means being provided on both said feed and takeup sides of the transfer printing medium supply means to hold said transfer printing medium in a clamped state and release said medium from the clamped state to a released state; and linkage means operatively interconnecting said clamping and forwarding means and said printing head for putting said clamping and forwarding means into said clamped state interlockingly with movement of said printing head into said superposed state with respect to the transfer printing medium and for putting said clamping and forwarding means into said released state interlockingly with the movement of said printing head from said superposed state to said nonsuperposed state with respect to the transfer printing medium.

2. The printing apparatus according to claim 1, wherein the transfer printing means comprises a printing head and a pressing roller facing said printing head.

3. The printing apparatus according to claim 1, wherein the printing head is provided with a pivotal shaft, and is superposed on the transfer medium or released therefrom in accordance with the direction in which said printing head is rotated about said pivotal shaft.

4. The printing apparatus according to claim 1, wherein the clamping and forwarding means provided on both said feed and takeup sides of said transfer printing means includes a one-way drive roller and pinch roller.

5. The printing apparatus according to claim 1, wherein said linkage means includes a pair of connecting means, each of which is coupled at one end to a rotor rotatable with the printing head and at the other end to the transfer printing medium clamping and forwarding means provided on both said feed and takeup sides of said transfer printing means.

6. The printing apparatus according to claim 1, wherein the printing head includes a detachable set shaft for assuring the superposition of said printing head on the transfer medium in said superposed state and the release of said printing head from said transfer medium in said nonsuperposed state.

7. The printing apparatus according to claim 6, which further comprises a switch actuated interlockingly with the drive of the set shaft of the printing head.

8. A printing apparatus comprising:

first supply means for supplying a sheet along a predetermined path;

printing head means disposed along said path for transferring a printed pattern from a transfer printing medium to a sheet supplied along said path by said sheet supply means;

mounting means for pivotally mounting said printing head means to permit pivotal movement thereof between a first position wherein said printing head means is in a printing relationship with respect to said transfer printing medium and a second position wherein said printing head means is in a nonprinting realtionship with respect to said transfer printing medium;

second supply means having a feed side and a takeup side for supplying said transfer printing medium along a portion of said path to said printing head means;

first and second clamping and forwarding means for clamping and forwarding said transer printing medium to said printing head means and respectively disposed on said feed and takeup sides of said second supply means, each of said first and second clamping and forwarding means being moveable between a clamped position wherein said transfer printing medium is fixedly clamped between said first and second clamping means and a released position wherein said transfer printing medium is permitted to advance between said feed and takeup sides; and linkage means connected to said first and second clamping and forwarding means and said printing head means for simultaneously moving said first and second clamping and forwarding means between said clamped and released positions in response to said printing head means pivotally moving between said first and second positions, respectively.

* * * * *